United States Patent [19]

Miller, III et al.

[11] Patent Number: 5,785,269
[45] Date of Patent: Jul. 28, 1998

[54] DUAL LEVEL RETRACTOR FOR OBLIQUE OR OFFSET IMPACTS

[75] Inventors: H. John Miller, III, Macomb Township, Mich.; Harjeet Gill, Windsor, Canada; Niels Dybro, Utica, Mich.

[73] Assignee: AlliedSignal Inc., Morristown, N.J.

[21] Appl. No.: 796,426

[22] Filed: Feb. 6, 1997

[51] Int. Cl.$^6$ ................................ B60R 22/28
[52] U.S. Cl. ...................... 242/379.1; 280/805
[58] Field of Search ............... 242/379.1; 280/805, 280/806; 297/470, 471, 472

[56] References Cited

U.S. PATENT DOCUMENTS 5,611,498  3/1997  Miller et al. ............... 242/379.1
5,618,006  4/1997  Sayles ........................ 242/379.1

*Primary Examiner*—John M. Jillions
*Attorney, Agent, or Firm*—Markell Seitzman

[57] ABSTRACT

An energy absorbing seat belt retractor (10) for controlling protraction of seat belt webbing (24) during a collision is provided. The seat belt retractor (10) includes a frame (12), a spool (20) rotatably supported on the frame (12) having webbing (24) wound thereabout, a bifurcated spool shaft (22) having a first portion (52) and a second independently rotatable portion (54), a locking mechanism (90, 91) associated with each portion of the spool shaft (22), and a load limiting mechanism (41, 43) interconnecting each shaft portion to the spool (20). The locking mechanisms (90, 91) are independently and simultaneously actuable by vehicle sensors (86, 87) to selectively engage and prevent rotation of either one or both of the first and second shaft portions (52, 54) to initiate operation of either one or both of the load limiting mechanisms (41, 43) to effectively control the threshold input force level required to permit controlled protraction of the seat belt webbing (24).

16 Claims, 6 Drawing Sheets

A

DUAL LEVEL RETRACTOR FOR OBLIQUE OR OFFSET IMPACTS

BACKGROUND AND SUMMARY OF THE INVENTION

The present disclosure relates generally to seat belt retractors. More particularly, the present disclosure relates to a seat belt retractor having a load limiting mechanism which absorbs energy applied to seat belt webbing during a vehicle collision and in so doing lessens the amount of energy absorbed by a vehicle occupant.

Seat belt retractors having load limiting mechanisms for absorbing energy produced during a collision are commonly used as part of a vehicle safety restraint system to protect vehicle occupants. A typical retractor includes a belt drum, a frame for rotatably supporting the belt drum, seat belt webbing wound about the belt drum, a locking mechanism for preventing rotation of the belt drum, a load limiting mechanism, and sensors for initiating belt drum lockup upon sensing certain dynamic conditions. The load limiting mechanism provides for controlled protraction of the seat belt webbing upon application of excessive force to the seat belt webbing, such as, the force applied to the belt webbing by a vehicle occupant during a collision.

Typically, a load limiting mechanism includes a deformable member, such as a torsion bar or a bushing, which prohibits rotation of a retractor belt drum below a threshold input force level. After the threshold input force level is exceeded, the deformable member is deformed, generating a controlled energy dissipating reaction force on the seat belt webbing to permit controlled rotation of the belt drum and the controlled pay out of the seat belt webbing from the belt drum. Load limiting mechanisms often result in higher occupant excursion within the vehicle which may be unacceptable for certain types of collisions. For example, during collisions involving oblique impacts, as compared to those involving front or side impacts, high occupant excursions are more likely to result in interior contact between the occupant and a deformed portion of the vehicle. Such is not desirable.

It is an object of the present invention to provide a seat belt retractor having an improved load limiting mechanism that requires a first threshold force level to initiate a first controlled protraction of the belt webbing during collisions involving front and side impacts and a second, higher threshold input force level to initiate a second controlled protraction of the seat belt webbing during collisions involving oblique impacts where higher occupant excursions are unacceptable. The invention herein describes an apparatus for improving the effectiveness of a load limiting mechanism of a seat belt retractor by providing means for sensing the direction of impact at the time of a vehicle collision and thereafter setting the threshold input force level necessary to generate the controlled energy dissipating reaction force on the seat belt webbing. The present invention comprises: an energy absorbing seat belt retractor including a frame, a spool rotatably supported on the frame having webbing wound thereabout, a bifurcated spool shaft having a first portion and a second independently rotatable portion, a locking mechanism associated with each portion of the spool shaft, and a load limiting mechanism interconnecting each shaft portion to the spool. The locking mechanisms are independently and simultaneously actuable by vehicle sensors to selectively engage and prevent rotation of either one or both of the first and second shaft portions to initiate operation of either one or both of the load limiting mechanisms to effectively control the threshold input force level required to permit controlled protraction of the seat belt webbing.

Many other objects and purposes of the invention will be clear from the following detailed description of the drawings.

DETAILED DESCRIPTION OF THE DRAWINGS

Figure 2:
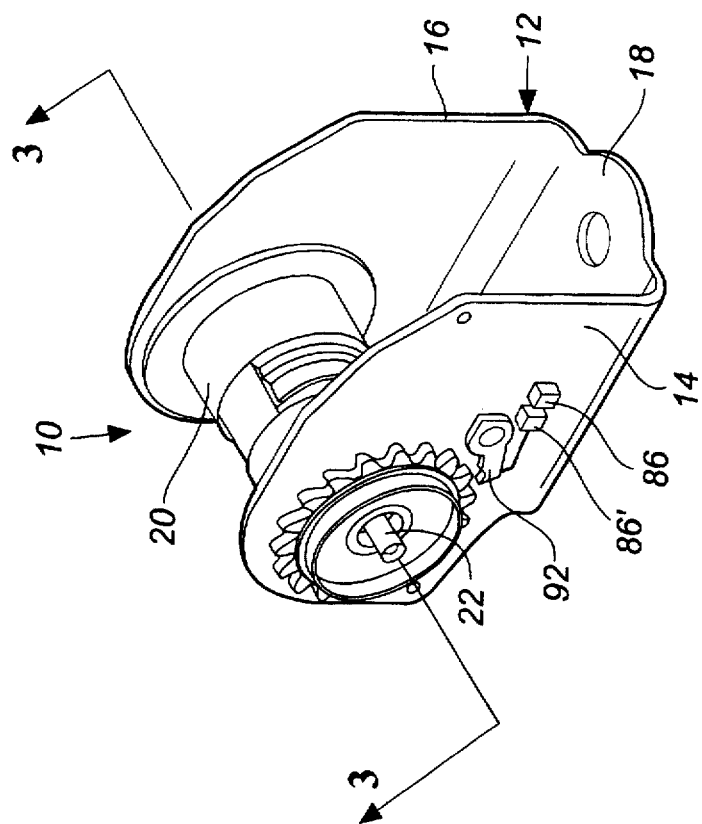
FIG. 2 is a perspective view of the seat belt retractor shown in FIG. 1 with cover plates removed.

Preferred embodiments of the presently disclosed seat belt retractor will now be described in detail with reference to the drawings, in which like reference numerals designate identical or corresponding elements in each of the several views.

Figure 1:
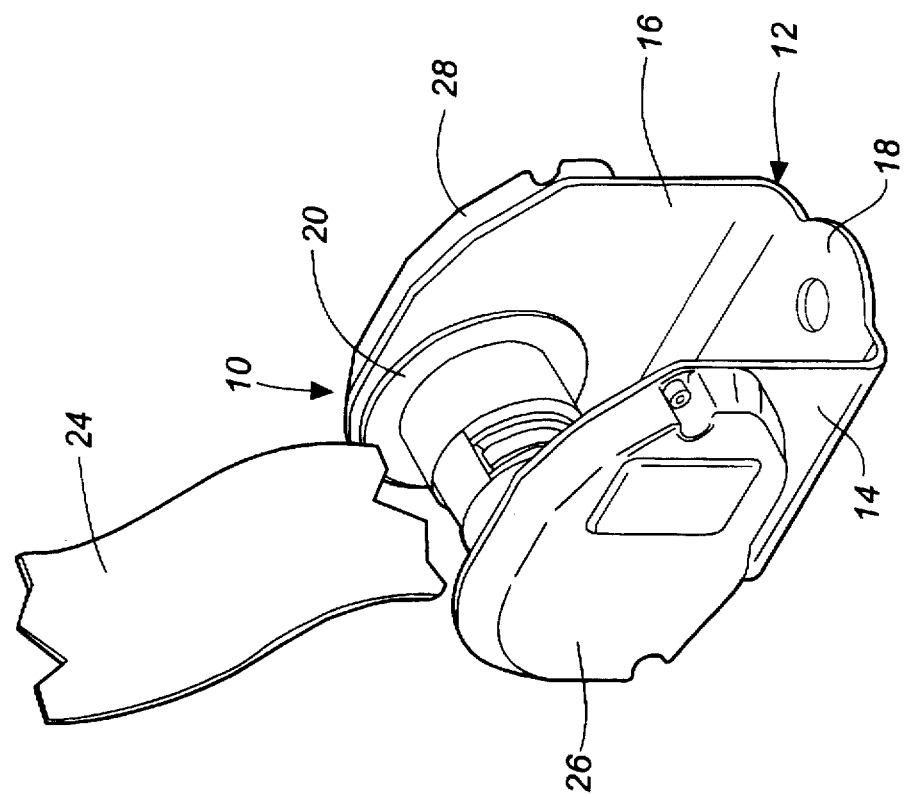
FIG. 1 is a side perspective view of one embodiment of the seat belt retractor.
Figure 3:
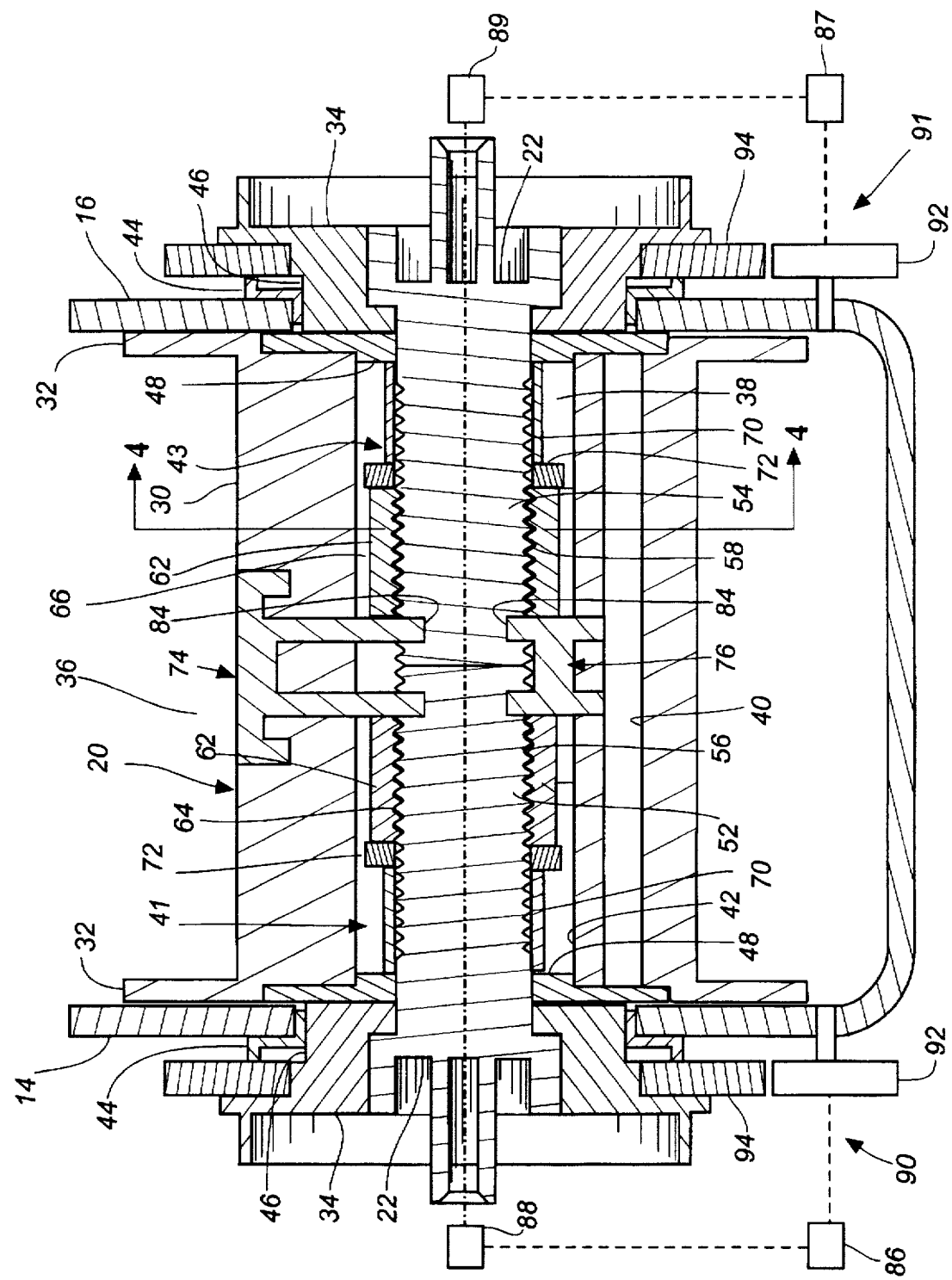
FIG. 3 is a cross-sectional view taken along section line 3—3 of FIG. 2.

FIGS. 1 and 2 illustrate one embodiment of the presently disclosed seat belt retractor shown generally as 10. Briefly, seat belt retractor 10 includes a U-shaped frame 12 adapted to be connected to a vehicle body or to an occupant seat of a vehicle. The frame 12 includes sides 14 and 16 interconnected by a central part 18. A reel or spool 20 is rotatably supported between frame sides 14 and 16 on a spool shaft 22. Spool 20 is adapted to receive seat belt webbing 24. First and second cover plates 26 and 28 are secured to frame sides 14 and 16, respectively, to define enclosures for internal components of seat belt retractor 10 disclosed in detail below. As illustrated in FIG. 3, spool 20 includes a cylindrical portion 30 having a flange 32 formed at each end thereof. Flanges 32 and cylindrical portion 30 define a channel 36 for receiving seat belt webbing 24 (FIG. 1). Spool 20 is also provided with a belt receiving slot 38 and a central throughbore 40 sized to receive spool shaft 22. Central throughbore 40 has a diameter larger than the outer diameter of spool shaft 22 to define therewith an annular chamber 42. Chamber 42 is dimensioned to receive components of the first and second load limiting mechanisms 41 and 43.

A lock wheel 34 is fastened to each end of the spool shaft 22. Although illustrated as being constructed of separate parts, lock wheel 34 and spool shaft 22 may be monolithically constructed. An annular bearing 44 is positioned at each end of shaft 22 between an outer bearing surface 46 formed on lock wheels 34 and frame sides 14 and 16 to rotatably support spool shaft 22 between the frame sides.

Spool 20 is positioned about spool shaft 22 with shaft 22 extending through throughbore 40. A spacer 48 mounted on each end of the shaft 22 maintains shaft 22 and spool 20 in axial alignment.

Preferably, each spacer 48 is rotatably mounted on shaft 22 and fixedly secured at its periphery to spool 20 to permit relative rotation of spool 20 and shaft 22 while minimizing friction losses during rotation. However, spacers 48 may be secured between shaft 22 and spool 20 in any manner permitting relative rotation of the spool and shaft.

Figure 5:
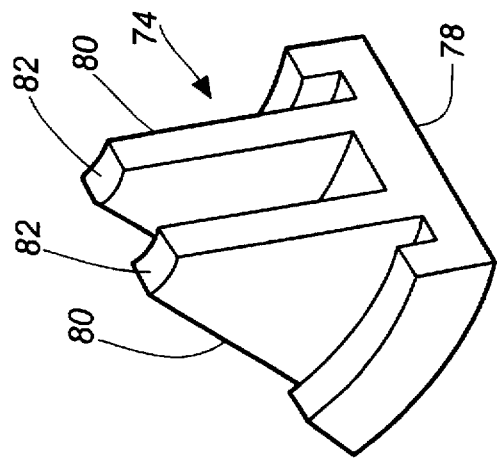
FIG. 5 is a side perspective view of the upper shaft support bearing of the seat belt retractor shown in FIG. 1.

Shaft 22 is bifurcated and includes a first shaft portion 52 and a second independently rotatable shaft portion 54. The outer periphery of first and second shaft portions 52 and 54 include threaded sections 56 and 58 sized to threadingly engage the first and second load limiting mechanisms 41 and 43. The central portion of each shaft portion 52 and 54 is rotatably supported by upper and lower shaft support bearings 74 and 76. Upper shaft support bearing 74, illustrated in FIG. 5, includes an outer portion 78 fastened to spool 20 and a pair of radially extending legs 80 having semi-cylindrical distal ends 82 slidably received within annular slots 84 formed in first and second shaft portions 52 and 54. Distal ends 82 are positioned in sliding contact with the central portion of each shaft portion 52 and 54 to facilitate independent rotation of each shaft portion. Lower shaft support bearing 76 is also fastened to spool 20 and provides support to first and second shaft portions 52 and 54 opposite upper shaft support bearing 74.

Figure 4:
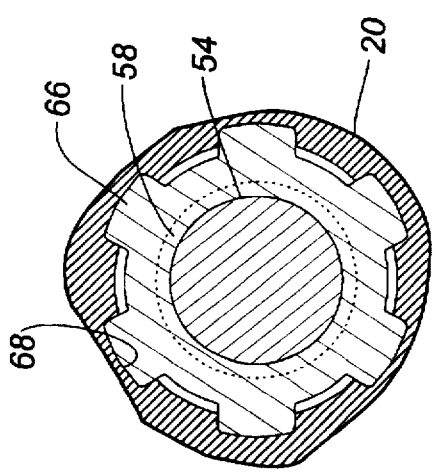
FIG. 4 is a cross-sectional view taken along section line 4—4 of FIG. 3.

Each load limiting mechanism 41 and 43 includes a driving member 62, a deformable impact bushing 70, and an annular ring or washer 72. Each driving member 62 has a central threaded throughbore 64 dimensioned to rotatably engage one of threaded sections 56 and 58 of shaft portions 52 and 54 and a plurality of splines 66 extending outwardly from its periphery as shown in FIG. 4. Splines 66 engage keyways 68 formed along the inner wall of throughbore 40 in spool 20 such that rotation of spool 20 with respect to shaft 22 causes corresponding rotation of driving member 62 about spool shaft 22. A deformable impact bushing 70 is positioned about each end of spool shaft 20 between bearing spacer 48 and driving member 62. Washer 72 is positioned between bushing 70 and driving member 62 and is axially movable in response to axial movement of driving member 62 into bushing 70 to deform bushing 70.

Referring again to FIGS. 2 and 3, each locking mechanism 90 and 91 includes a locking pawl 92 and locking teeth 94. One of locking mechanisms 90 and 91 is located adjacent each end of shaft 22. Locking teeth 94 are mounted about the outer periphery of lock wheels 34, and locking pawl 92 is mounted on each of frame sides 14 and 16 and is movable in response to vehicle sensors 86 and 87 and/or web sensors 88 and 89 into engagement with locking teeth 94 to prevent further rotation of lock wheel 34, and thus prevent rotation of either one or both shaft portions 52 and 54. Although locking pawl 92 is illustrated as being pivotably fastened to frame side 14, other types of movement are envisioned. As can be appreciated, the vehicle and web sensors are diagrammatically illustrated. A variety of such sensors exists in the art.

Figure 6:
FIG. 6 is a schematic view of the operational impact regions of the seat belt retractor shown in FIG. 1.
Figure 6:
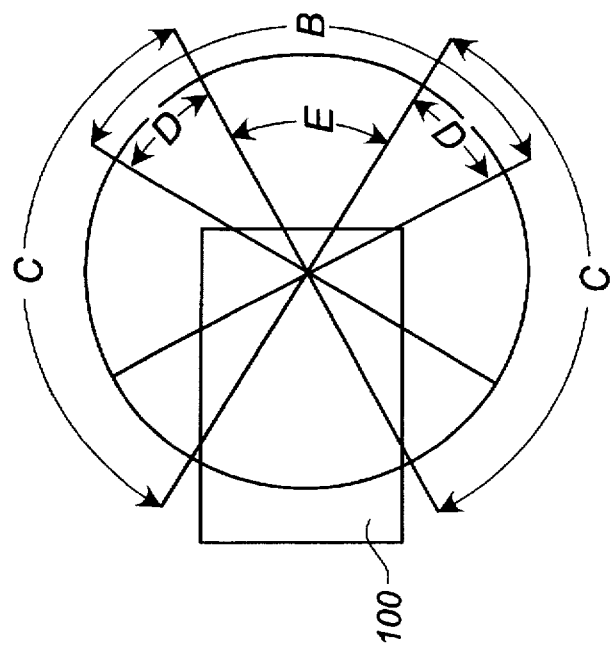

Referring to FIGS. 3 and 6, vehicle sensors 86 and 87, which may be inertial or electronic sensors, for example, are installed to actuate locking mechanisms 90 and 91 during different types of vehicle collisions. Vehicle sensor 86 is a frontal impact sensor designed to actuate locking mechanism 90 when a vehicle 100, moving in the direction indicated by arrow "A", has a frontal impact in the zone indicated by reference "B". Vehicle sensor 87 is a side impact sensor designed to actuate locking mechanism 91 when vehicle 100 has a side impact in the zones indicated by references "C". Frontal impact zone B and side impact zones C overlap to define oblique impact zones indicated by references "D". During a collision in the oblique impact zone D, vehicle sensors 86 and 87 simultaneously actuate locking mechanisms 90 and 91 to prevent rotation of both the first and second shaft portions 52 and 54.

If the vehicle sensors 86 or 87 are electric, each such sensor may include an electronic accelerometer, the output of which, after it is appropriately conditioned and amplified, drives a respective solenoid 86'. The solenoid 86' moves a respective lock pawl 92 into and out of engagement in response to the frontal or side impact crash conditions as sensed by the appropriate electronic vehicle sensor 86 or 87.

Figure 7:
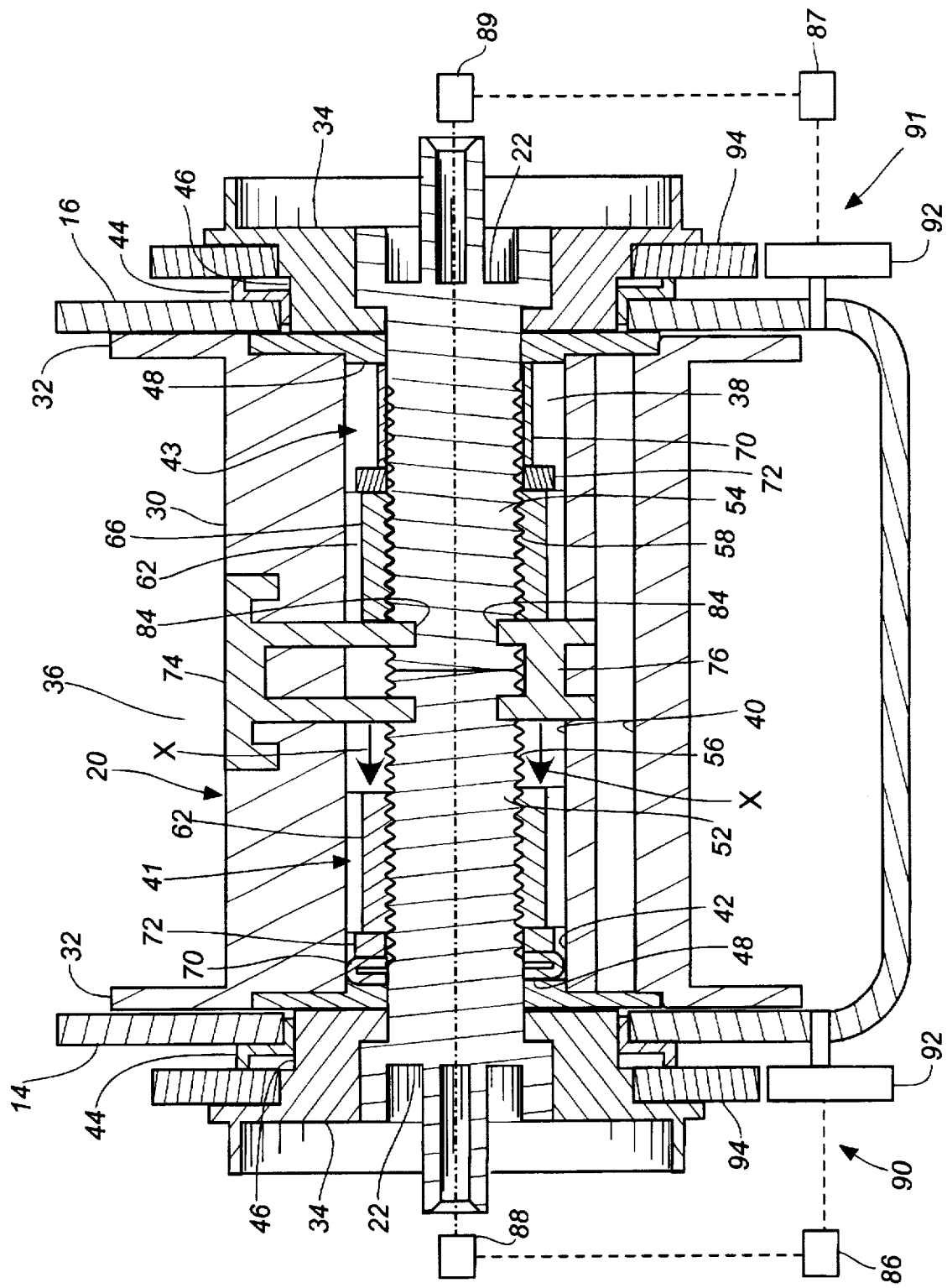
FIG. 7 is a side perspective view of the seat belt retractor shown in FIG. 1 with the first driving member in the advanced position.

Operation of seat belt retractor 10 will now be described with reference to FIGS. 6–9. Referring now to FIGS. 6 and 7, when vehicle 100 is involved in a collision in region "E" of frontal impact region "B", vehicle sensor 86 actuates locking mechanism 90 to move locking pawl 92 into engagement with locking teeth 94 to prevent further rotation of lock wheel 34 and first shaft portion 52. As a vehicle occupant moves forward into belt webbing 24 (FIG. 1) as a result of the collision, a torque is applied to spool 20 tending to rotate the spool 20 about spool shaft 22 and effect protraction of seat belt webbing 24. Because driving member 62 is coupled to spool 20 by splines 66, rotation of spool 20 is prevented until the torque on spool 20 is sufficient to cause driving member 62 to deform bushing 70. When a sufficient torque is generated, rotation of spool 20 causes rotation of driving member 62 about threads 56 of first shaft portion 52, to advance driving member 62 axially in the direction indicated by arrow "X" into washer 72, to deform bushing 70. It is noted that because second shaft portion 54 is freely rotatable, engagement of driving member 62 and spool 20 via splines 66 merely causes second shaft portion 54 to rotate with spool 20.

Figure 8:
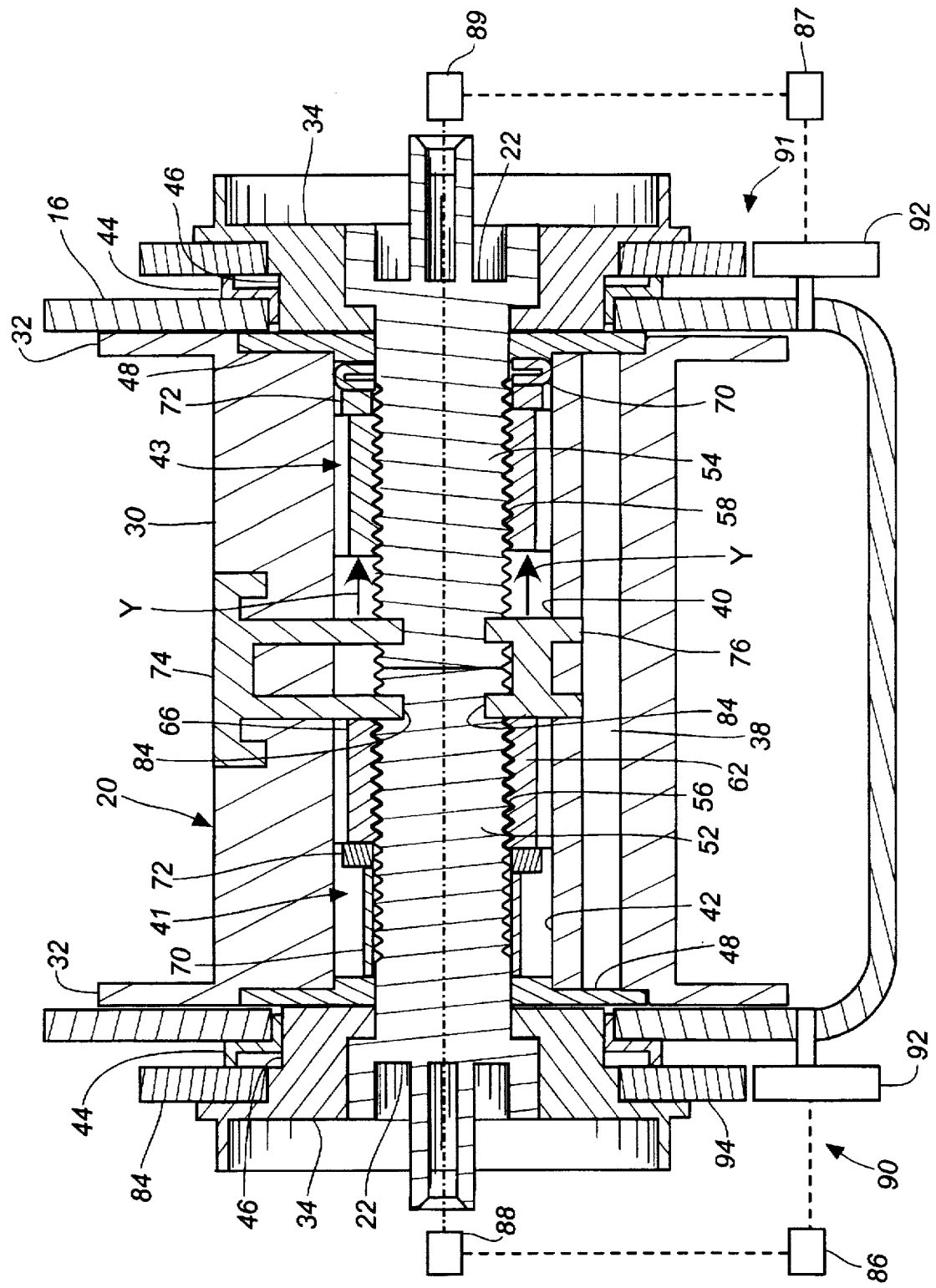
FIG. 8 is a cross-sectional view of the seat belt retractor shown in FIG. 2 with the second driving member in an advanced position.

Referring now to FIGS. 6 and 8, when a vehicle is involved in a collision in region "F" of side impact region "C", vehicle sensor 87 actuates locking mechanism 91 to move locking pawl 92 into engagement with locking teeth 94 to prevent further rotation of lock wheel 34 and second shaft portion 54. As a vehicle occupant is moved into belt webbing (24) as a result of the collision, a torque is applied to spool 20 tending to rotate spool 20 about spool shaft 22 and effect protraction of belt webbing 24. Because driving member 62 is coupled to spool 20 by splines 66, rotation of spool 20 is prevented until the torque is sufficient to deform bushing 70. When a sufficient torque is generated, rotation of spool 20 causes rotation of driving member 62 about threads 58 of second shaft portion 52 to advance driving member 62 axially in the direction indicated by arrow "Y" into washer 72, to deform bushing 70. It is noted that because first shaft portion 52 is freely rotatable, engagement of driving member 62 and spool 20 via splines merely causes first shaft portion 52 to rotate with spool 20.

Figure 9:
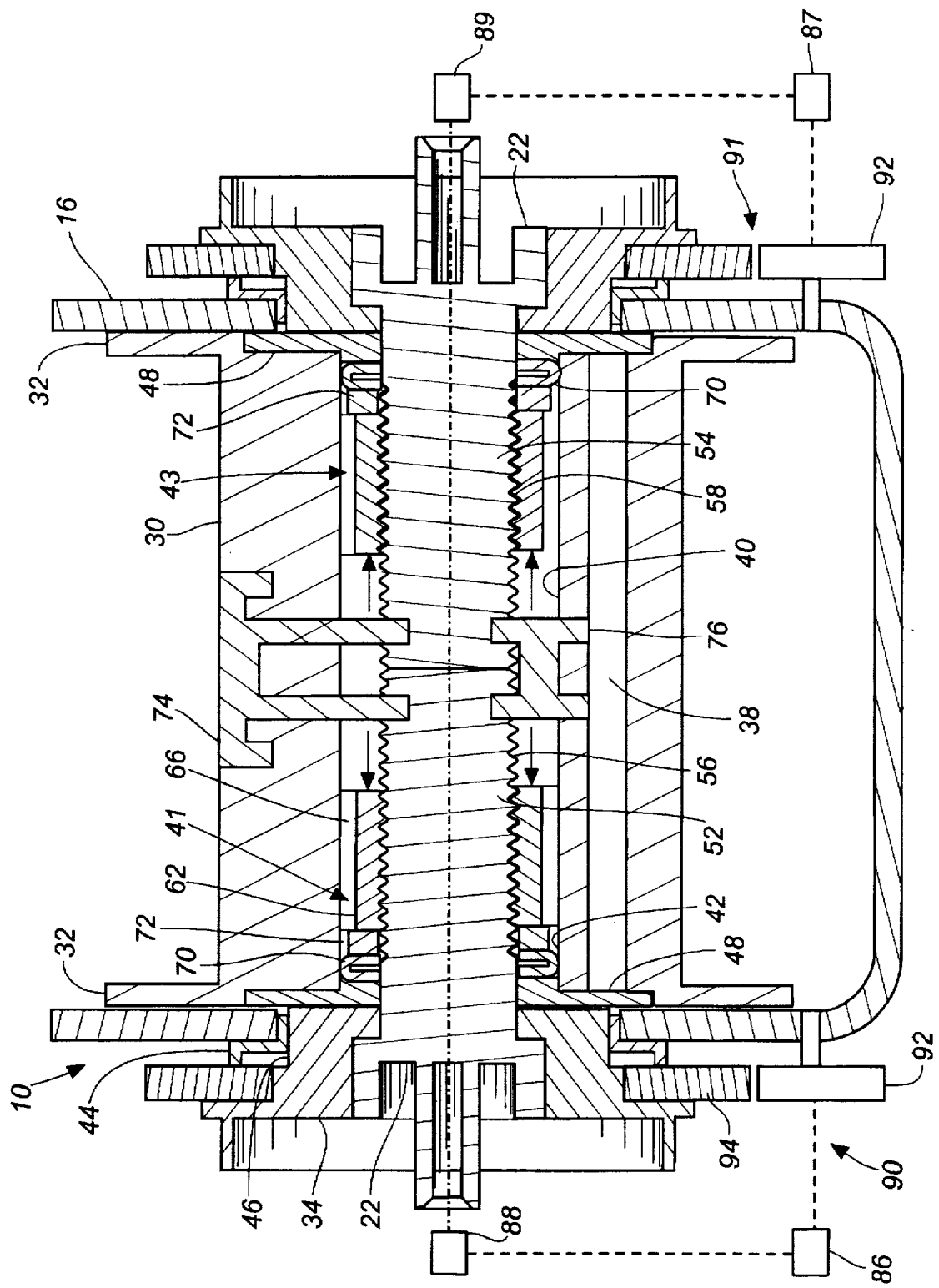
FIG. 9 is a cross-sectional view of the seat belt retractor shown in FIG. 1 with the first and second driving members in the advanced position.

Referring now to FIGS. 6 and 9, when a vehicle is involved in a collision in the oblique impact region "D", vehicle sensors 86 and 87 actuate locking mechanisms 90 and 91 to prevent further rotation of both the first and the second shaft portions 52 and 54. As a vehicle occupant is moved into belt webbing (24) (FIG. 1) as a result of the collision, a torque is applied to spool 20 tending to rotate spool 20 about spool shaft 22 and permit protraction of seat belt webbing 24. Because both first and second shaft portions 52 and 54 are prevented from rotation by locking mechanisms 90 and 91, the torque required to rotate spool 20 to permit protraction of belt webbing 24 must be sufficient to deform both deformable bushings 70. Upon reaching this threshold force level, rotation of spool 20 causes rotation of drive members 62 about threads 56 and 58 of first and second shaft portions 52 and 54, to advance both driving members 62 into annular washers 72 to deform bushings 70 and permit controlled protraction of seat belt webbing 24.

It will be understood that various modifications may be made to the embodiments disclosed herein. For example, each of the bushings may have a pre-selected deformation strength to provide a multiplicity of different threshold force levels which effect a multiplicity of controlled seat belt webbing protraction rates. Therefore, the above description should not be construed as limiting, but merely as exemplifications of preferred embodiments. Those skilled in the art will envision other modifications within the scope and spirit of the claims appended thereto.

Many changes and modifications in the above described embodiment of the invention can, of course, be carried out without departing from the scope thereof. Accordingly, that scope is intended to be limited only by the scope of the appended claims.

We claim:

1. A seat belt retractor comprising:

a frame (12);

a spool (20) rotatably mounted relative to the frame (12) for protracting and retracting belt webbing (24) wound thereabout;

a spool shaft (22) rotatable mounted relative to the frame and operatively associated with the spool, the spool shaft (22) first portion (52) and a second portion (54), the first and second portions being independently rotatable;

a first load limiting mechanism (41) in operative position relative to the spool (20) and the first portion (52) of the spool shaft (20), the first load limiting mechanism (41) inhibiting relative movement between the spool (20) and the spool shaft (22) below a first threshold input force; and a second load limiting mechanism (43) in operative position relative to the spool (20) and the second portion (54) of the spool shaft (22), the second load limiting mechanism (43) inhibiting relative movement between the spool (20) and the spool shaft (22) below a second threshold input force;

further comprising a first sensor (86) operatively associated with the first load limiting mechanism (43), the first sensor (86) being operable upon sensing first predetermined dynamic conditions to move the first locking mechanism (90) from the unlocked to the locked position and a second sensor (87) operatively associated with the second load limiting mechanism (43), the second sensor (87) operatively upon sensing second predetermined dynamic conditions to move the second locking mechanism (91) from the unlocked to the locked position;

wherein the first predetermined dynamic conditions result from a collision involving a frontal impact within a region (B) defined by a first arc covering approximately one hundred twenty degrees and being symmetrical about the longitudinal centerline of the front of the vehicle, wherein the second predetermined dynamic conditions result from a collision involving a side impact within regions (C) defined by a pair of second arcs, each of the arcs covering approximately one hundred twenty degrees on opposite sides of the vehicle, the second arcs being symmetrical about a transverse centerline of the vehicle.

2. A seat belt retractor according to claim 1, further including a first locking mechanism (90), the first locking mechanism (90) being movable from an unlocked position to a locked position in operative engagement with the spool shaft (22) to inhibit rotation of the first portion (52) of the spool shaft (22) relative to the frame (12).

3. A seat belt retractor according to claim 2, further including a second locking mechanism (91), the second locking mechanism (91) being movable from an unlocked position to a locked position in operative engagement with the spool shaft (22) to inhibit rotation of the second portion (54) of the spool shaft (22) relative to the frame (12).

4. A seat belt retractor according to claim 3, wherein the first load limiting mechanism (41) includes a first deformable member (70) operatively associated with the first portion (52) of the spool shaft (22) and the spool (20), the first deformable member (70) preventing relative rotation between the first portion (52) of the spool shaft (22) and the spool (20) when the first locking mechanism (41) is in the locked position until the first threshold input force sufficient to deform the first deformable member (70) is applied to the spool.

5. A seat belt retractor according to claim 4, wherein the second load limiting mechanism (43) includes a second deformable member (70) operatively associated with the second portion (54) of the spool shaft (22) and the spool (20), the second deformable member (70) preventing relative rotation between the second portion (54) of the spool shaft (22) and the spool (20) when the second locking mechanism (43) is in the locked position until the second threshold input force sufficient to deform the second deformable member is applied to the spool (20).

6. A seat belt retractor according to claim 1, wherein the first arc overlaps the second arcs to define two oblique impact regions (D), wherein in a collision involving impact in one of the oblique impact regions, the first and second sensors (86, 87) are operable concurrently to move the first and the second locking mechanisms (90, 91) to the locked position.

7. A seat belt retractor for restraining an occupant of a vehicle during a collision comprising:

a frame (12) having first and second sides (14, 16);

a spool (20) rotatably mounted relative to the frame (12) for protracting and retracting belt webbing (24) wound thereabout;

a first load limiting mechanism (41) associated with the spool (20), the first load limiting mechanism (41) being operable to inhibit rotation of the spool (20) until a first threshold force is applied to the spool (20), and thereafter to effect controlled protraction of the seat belt webbing (24) from about the spool (20); and a second load limiting mechanism (43) associated with the spool (20), the second load limiting mechanism (43) being operable to inhibit rotation of the spool (20) until a second threshold force is applied to the spool (20), and thereafter to effect controlled protraction of the seat belt webbing (24), the second threshold force being different from the first threshold force;

a spool shaft (22) rotatable mounted relative to the frame (12) and to the spool (20), the spool shaft (22) having a first shaft portion (52) and a second independently rotatable shaft portion (54);

a first locking mechanism (90), the first locking mechanism (90) being movable from an unlocked position to a locked position in operative engagement with the first shaft portion (52) to inhibit rotation of the first shaft portion (52);

wherein the first load limiting mechanism (41) includes a first driving member (62) threadably received about the first shaft portion (52) and operably connected to the spool (20) and a first deformable member (70) positioned between the first driving member (62) and one of the frame sides (14, 16), wherein the first threshold force is the force required to move the first driving member (62) to deform the first deformable member (70).

8. A seat belt retractor according to claim 7, further including a second locking mechanism (91), the second locking mechanism (91) being movable from an unlocked position to a locked position in operative engagement with the second shaft portion (54) to inhibit rotation of the second shaft portion (54).

9. A seat belt retractor according to claim 8, wherein the second load limiting mechanism (43) includes a second driving member (62) threadably received about the second shaft portion (54) and operably connected to the spool (20) and a second deformable member (70) positioned between the second driving member (62) and one of the frame sides (14, 16), wherein the second threshold force is the force required to move the second driving member (62) to deform the second deformable member (70).

10. A seat belt retractor according to claim 7, further comprising a first sensor (86) operatively associated with the first load limiting mechanism (41), the first sensor (86) being operable upon sensing first predetermined dynamic conditions to move the first locking mechanism (90) from the unlocked to the locked position.

11. A seat belt retractor according to claim 10, further comprising a second sensor (87) operatively associated with the second load limiting mechanism (43), the second sensor (87) being operable upon sensing second predetermined dynamic conditions to move the second locking mechanism (91) from the unlocked to the locked position.

12. A seat belt retractor according to claim 11, wherein the first predetermined dynamic conditions result from a collision involving a frontal impact within a region (b) defined by a first arc covering approximately one hundred twenty degrees and being symmetrical about the longitudinal centerline of the front of the vehicle.

13. A seat belt retractor according to claim 12, wherein the second predetermined dynamic conditions result from a collision involving a side impact within regions (C) defined by a pair of second arcs, each of the arcs covering approximately one hundred twenty degrees on opposite sides of the vehicle, the arcs being symmetrical about a transverse centerline of the vehicle.

14. A seat belt retractor system comprising:

a frame (12);

a spool (20) rotatably mounted relative to the frame (12) for protracting and retracting belt webbing (24) wound thereabout;

first load limiting mechanism means (41) for inhibiting relative movement between the spool (20) and the spool shaft (22) below a first threshold input force;

second load limiting mechanism means (43) for inhibiting relative movement between the spool (20) and the spool shaft (22) below a second threshold input force;

a first sensor (86) operatively associated with the first load limiting mechanism means (43), the first sensor (86) being operable upon sensing first predetermined dynamic conditions to move the first locking mechanism means (90) from the unlocked to the locked position and a second sensor (87) operatively associated with the second load limiting mechanism means (43), the second sensor (87) being operable upon sensing second predetermined dynamic conditions to move the second locking mechanism (91) from the unlocked to the locked position;

wherein the first predetermined dynamic conditions result from a collision involving a frontal impact within a region (B) defined by a first arc symmetrically oriented about the longitudinal centerline of the front of the vehicle, wherein the second predetermined dynamic conditions result from a collision involving a side impact within regions (C) defined by a pair of second arcs, the second arcs being symmetrical about a transverse centerline of the vehicle.

15. The seat belt retractor system according to claim 14 wherein the first arc covers approximately one hundred twenty degrees.

16. The seat belt retractor system as defined in claim 14 wherein the each arc of the second pair of arcs of is approximately one hundred twenty degrees.

* * * * *